United States Patent
Eberspaecher et al.

(10) Patent No.: US 11,573,288 B2
(45) Date of Patent: Feb. 7, 2023

(54) MULTI-FIELD ZONE PROXIMITY SENSOR AS WELL AS A METHOD FOR MEASURING A DISTANCE OF AN OBJECT FROM THE MULTI-FIELD ZONE PROXIMITY SENSOR

(71) Applicant: Balluff GmbH, Neuhausen a.d.F (DE)

(72) Inventors: Mark Eberspaecher, Frickenhausen (DE); Attila Szabo, Iszkaszentgyorgy (HU)

(73) Assignee: BALLUFF GMBH, Neuhausen a.d.F (DE)

( * ) Notice: Subject to any disclaimer, the term of this patent is extended or adjusted under 35 U.S.C. 154(b) by 435 days.

(21) Appl. No.: 16/509,547

(22) Filed: Jul. 12, 2019

(65) Prior Publication Data
US 2020/0018820 A1    Jan. 16, 2020

(30) Foreign Application Priority Data
Jul. 16, 2018    (DE) .......................... 102018117145.5

(51) Int. Cl.
| | |
|---|---|
| *G01S 13/08* | (2006.01) |
| *G01S 7/03* | (2006.01) |
| *G01S 7/02* | (2006.01) |

(52) U.S. Cl.
CPC ............... *G01S 7/03* (2013.01); *G01S 13/08* (2013.01); *G01S 7/027* (2021.05)

(58) Field of Classification Search
CPC ............. G01S 7/03; G01S 13/08; G01S 7/027
See application file for complete search history.

(56) References Cited

U.S. PATENT DOCUMENTS

| 4,721,901 A * | 1/1988 | Ashley .................. G01R 27/06 324/646 |
| 10,132,922 B2 | 11/2018 | Fericean et al. |
| 10,305,198 B2 * | 5/2019 | Schleef .................. H01Q 1/007 |
| 2012/0212366 A1 * | 8/2012 | Alalusi ..................... G01S 7/03 342/118 |
| 2012/0229324 A1 * | 9/2012 | Gow ........................ G01S 13/04 342/27 |
| 2014/0125516 A1 * | 5/2014 | Ghasr ..................... G01S 13/32 342/25 A |
| 2014/0354173 A1 * | 12/2014 | Matsuno ........... H01J 37/32183 315/287 |

(Continued)

FOREIGN PATENT DOCUMENTS

| CN | 110808724 A * | 2/2020 |
| DE | 202013105906 | 2/2014 |

(Continued)

*Primary Examiner* — Timothy A Brainard
(74) *Attorney, Agent, or Firm* — Reches Patents (57) ABSTRACT

A multi-field zone proximity sensor (10) for measuring a distance (1) of an object (22) from the multi-field zone proximity sensor (10) The multi-field zone proximity sensor (10) has a housing (12) that includes an antenna structure (14) that is arranged in or close to a side (19) of the housing (12). The antenna structure (14) is set up for emitting an electromagnetic transmission free space wave (20) and for receiving an electromagnetic reflection wave (24) reflected on the object (22). The multi-field zone proximity sensor (10) has sensor electronics (16) which are set up to determine the distance (l) of the object (22) from the multi-field zone proximity sensor (10) based on the received reflection wave (24).

28 Claims, 6 Drawing Sheets

(56) References Cited

U.S. PATENT DOCUMENTS

| | | | |
|---|---|---|---|
| 2017/0363730 A1 | 12/2017 | Eberspaecher et al. | |
| 2018/0159222 A1* | 6/2018 | Backes | H03H 7/40 |
| 2018/0341000 A1* | 11/2018 | Cohen | G01S 13/08 |
| 2019/0072659 A1* | 3/2019 | Gu | G01S 13/931 |
| 2019/0170856 A1* | 6/2019 | Iida | G01S 7/35 |
| 2020/0011971 A1* | 1/2020 | Cho | G06N 20/10 |

FOREIGN PATENT DOCUMENTS

| | | |
|---|---|---|
| DE | 202013105906 | 4/2014 |
| WO | 2015/000452 | 7/2013 |
| WO | 2016/101940 | 12/2014 |

\* cited by examiner

MULTI-FIELD ZONE PROXIMITY SENSOR AS WELL AS A METHOD FOR MEASURING A DISTANCE OF AN OBJECT FROM THE MULTI-FIELD ZONE PROXIMITY SENSOR

The invention relates to a multi-field zone proximity sensor as well as a method for measuring a distance of an object from the multi-field zone proximity sensor, a computer program and a machine-readable storage medium.

PRIOR ART

Proximity sensors as well as associated methods for measuring a distance from the respective sensor to an object are known from WO 2015/000452 A1 as well as WO 2016/101940. Both proximity sensors are based on the waveguide principle, such that an electromagnetic wave generated by a microwave oscillator in a housing of the sensor is converted into a waveguide wave mode which is guided in the housing to an opening of the housing and there is emitted as a free space wave in the direction of the object. An electromagnetic wave reflected on the object is coupled into the housing as a waveguide mode and guided to sensor electronics in the housing. Determining the distance between the object and the sensor takes place using a reflection factor which is determined based on the transmission wave and the reflection wave. The useable measuring range of these sensors extends from zero to up to 20 millimetres.

An object of the present invention is to provide measures with which determining the distance of the object from a sensor can be enabled in a larger measuring range, especially accurately and with simultaneous increased flexibility of the shaping of the sensor and increased installation flexibility of the sensor.

DISCLOSURE OF THE INVENTION

According to a first aspect, a multi-field zone proximity sensor is provided for measuring a distance of an object from a multi-field zone proximity sensor, wherein the multi-field zone proximity sensor has a housing in which an antenna structure is incorporated, which is arranged in or near a side of the housing, wherein the antenna structure is set up for emitting an electromagnetic transmission free space wave and for receiving an electromagnetic reflection wave reflected on an object, wherein the multi-field zone proximity sensor has sensor electronics which are set up to determine the distance of the object from the multi-field zone proximity sensor based on the received reflection wave.

The sensor according to the invention is based on the principle that a high-frequency free space wave can be generated in the aperture of the housing which can be emitted in the direction of the object. In contrast to the proximity sensors described in WO 2015/000452 A1 and WO 2016/101940, this principle can thus avoid the practice of a waveguide wave being guided in a waveguide that can be formed by the housing. In other words, regardless of whether waves that can propagate are present in a waveguide, an electromagnetic transmission wave can be discharged into the free space as a free space wave, because the antennae structure can be placed directly adjacent to or in the side of the housing, in particular a side wall of the housing, and evanescent waves can be not subsided due to the low to non-existent distance to the aperture that corresponds to the housing side, and thus emission of the wave(s) into the free space can take place steadily. Possible operating frequencies of the multi-field zone proximity sensor can be within the industrial, scientific and medical bands (SIM bands), for example in a range of 24.0 GHz to 24.25 GHz or 5.735 GHz to 5.875 GHz.

Thus, the operating frequency of the sensor can be independent of the geometry of a waveguide and thus independent of a structural shape of the housing, because the housing no longer has to serve as a waveguide. In other words, a fixed dependency between the operating frequency of the sensor and the housing dimensions can no longer exist. Consequently, the distance can be exactly determined in all field regions of the sensor. Such field regions can be, for example, the reactive near field, the radiative near field and the far field. Thus, the reactive near field can be understood to be a distance $r$ from the antenna structure, said distance satisfying $r \leq 0.62\sqrt{D^3/\lambda}$. Here, $D$ can denote the largest dimension of the antenna structure and $\lambda$ can denote a wavelength of the antenna structure. The radiative near field can be understood to be a distance from the antenna structure which can satisfy $0.62\sqrt{D^3/\lambda} < r \leq 2D^2/\lambda$. The far field can be understood to be a distance $r$ from the antenna structure which satisfies $2D^2/\lambda > r$. The radiative near field can only exist when $D > \lambda$. In comparison to the sensor, a radar sensor can typically only work in the far field.

Because the operating frequency can be chosen independently of the geometry of the housing, the sensor can have various structural shapes and thus can be used flexibly in all installation positions by the housing shape of the sensor being able to be freely chosen corresponding to the required installation situation.

Because the determination of the distance is based on an evaluation of the received signals, this can be carried out directly without measuring further parameters.

The proximity sensor can only recognise one individual object in its detection range, while radar sensors, i.e. sensors which are based on a radar principle and emit a free space wave in the radar range, can normally recognise several objects. However, the distance detectable from the proximity sensor can be from 0 mm to one hundred times the wavelengths. For example, with a wavelength of $\lambda = 12.5$ mm, the sensor can measure up to 400 mm. This distance can correspond, for example, to the distance between the antenna structure or the housing side and the object upper surface. In comparison, radar sensor can typically only measure in the far field, such that these sensors cannot operate with the same precision up to a distance of 0. Thus, a radar sensor cannot be referred to as a multi-field zone proximity sensor.

The sensor electronics can also be incorporated in the housing.

In one embodiment, the side can have an opening and the antenna structure can be arranged in or near the opening.

In an alternative embodiment, the side can be formed of a material which is transparent for electromagnetic waves, for example Teflon, such that the side can form a transparent window through which the transmission wave and the reflection wave can penetrate.

Both embodiments represent especially simple implementations for the arrangement of the antenna structure in the housing.

In one embodiment, the housing can be formed cylindrically and the antenna structure can be applied to a circuit board which extends within the housing along a longitudinal axis of the cylindrically formed housing. Here, the antenna structure can be closely arranged on the circuit board end in the direction of the active side of the multi-field zone, i.e. near the opening or the side.

In an alternative embodiment, the housing can be formed cylindrically and the antenna structure can be applied to a circuit board which extends perpendicular to a longitudinal axis of the cylindrically housing in the region of the side of the housing, in particular of the opening of the housing. Here, the circuit board can be arranged perpendicular to a further circuit board which extends in the housing along the longitudinal axis of the housing.

Both exemplary embodiments enable an especially small and compact implementation of the multi-field zone proximity sensor. In both cases, the sensor electronics can be arranged on the circuit board extending parallel to the longitudinal axis of the cylindrical housing, for example in a circuit board region facing away from the antenna structure.

In one embodiment, the opening can be closed with a closure cap made of plastic. The plastic can be, for example, transmissive or transparent for electromagnetic waves and/or moisture resistant. The plastic can, for example, have Teflon or be formed of it. Thus, the multi-field zone sensor can on the one hand generate a sufficiently large signal to determine the distance and on the other hand have a low moisture absorption which could damage the interior of the multi-field zone sensor.

In one embodiment, the opening can be closed by means of a closure cap made of plastic, in which the antenna structure is incorporated or onto which the antenna structure is applied, and the antenna structure can extend substantially perpendicular to a longitudinal axis of the cylindrically formed housing. The plastic can, for example, have Teflon or be formed of it. Here, the antenna structure can be integrated into the closure cap, for example using 3D printing, by suitable structuring of a conductive plastic, for example conductive graphene polylactide (PLA) filament, or be applied to the closure cap as a conductive coating, for example to its inner side, by means of, for example, Moulded Interconnected Device (MID) technology. This can enable an especially cost-effective, moisture-resistant and simple implementation of the multi-field zone proximity sensor.

For example, the cylindrical housing can be formed as an M12 threaded tube having an inner diameter of 9.4 mm, such that a standard sensor housing can be used and the multi-field zone sensor can be retrofitted in the place of another sensor in an especially simple manner. In particular, a lower operating frequency of the threaded tube of 18.7 GHz, if it were operated as a waveguide, can be not exceeded during operation of the multi-field zone proximity sensor.

In the case of a cylindrical design of the housing, the side can be formed as a front side.

In one embodiment, the housing can be formed to be cuboid-shaped and the side can correspond to a, preferably the largest, side of the housing. In an alternative embodiment, the housing can be formed to be cuboid-shaped and the side can correspond to a (any) side of the housing. In both options, the opening can be present in the corresponding side wall. These measures can cause standard structural shapes of sensor housing to be able to be used for the multi-field zone proximity sensor. Furthermore, these measures can enable an especially small and compact implementation of the multi-field zone proximity sensor. By providing the opening or the transparent window on the largest side of the cuboid-shaped housing, this can achieve that the electromagnetic energy is focused especially well in a predetermined direction.

As long as the cuboid-shaped or cube-shaped housing is provided with the opening, the opening can be closed with a closure cap made of plastic. The plastic can be, for example, transmissive or transparent for electromagnetic waves and/or moisture-resistant. Furthermore, the plastic can have Teflon or be formed of it. Thus, the multi-field zone proximity sensor can, on the one hand, generate a sufficiently large signal for determining the distance and, on the other hand, have a low moisture absorption, which could damage the multi-field proximity sensor.

The cuboid-shaped housing can, for example, be 40×40×40 mm large, such that a standard sensor housing can be used and the multi-field zone proximity sensor can be retrofitted in the place of another sensor in an especially simple manner.

In one embodiment, the antenna structure can be applied to a circuit board which extends along the side, in particular the opening, or the opening can be closed with a closure cap made of plastic into which the antenna structure is incorporated or onto which the antenna structure is applied. The plastic can have Teflon or be formed of it. In the case that the antenna structure is applied to a circuit board, the cuboid-shaped or cube-shaped housing, as described above, can likewise be closed with a closure cap made of plastic, which is transparent for the electromagnetic wave. The sensor electronics can be arranged on the same circuit board as the antenna structure or on a further circuit board which can extend in the housing, for example, perpendicular to the circuit board having the antenna structure. As already mentioned above, the antenna structure can be integrally incorporated into the plastic as a conductive structure, for example using a conductive graphene polylactide (PLA) filament using 3D printing, or applied as a conductive coating, for example, to a surface of the closure cap (for example using MID technology), said surface facing towards the housing interior. This also enables an especially cost-effective, moisture-resistant and simple implementation of the multi-field zone proximity sensor.

The closure cap can form a part of the housing as a separate structural shape, in particular independently of the shape of the housing.

In one embodiment, a face of the circuit board or the closure cap, which is free from the antenna structure, can be provided with an absorbent material. The part of the reflection wave which is not received by the antenna structure can thus be absorbed, such that multiple reflections on the circuit board or the closure cap can advantageously be avoided. The absorbent material can, for example, be implemented as an absorbent label or realised by a special material of the closure cap, said material being strongly lossy in this region. The label can be formed, for example, as Eccosorb® GDS by Emerson & Cumin.

It is also possible that the absorbent material is provided on an outer face of the housing which faces towards the detection region and which does not cover the antenna structure.

In one embodiment, the at least one side of the housing or the entire housing can be formed of dielectric material, e.g. Teflon, and the antenna structure can be arranged in the side or directly on the side. Here, the antenna structure can be integrated into the side wall or arranged directly on the inner side of the side wall. In other words, the antenna structure cannot be applied on a circuit board, while the sensor electronics can be arranged on a circuit board which can be arranged in the housing. The housing can be formed integrally. The housing can be formed to be cylindrical, cuboid-shaped or cube-shaped. The antenna structure be integrated in the side wall, for example using 3D printing, by suitable structuring of a conductive plastic, for example conductive graphene polylactide (PLA) filament, or be applied as a conductive coating to the inner side of the side wall by means of, for example, Moulded Interconnected Device (MID) technology. This can enable an especially cost-effective, moisture-resistant and simple implementation of the multi-field zone proximity sensor.

In one embodiment, the antenna structure is formed to be planar, such that it can be placed especially simply in the opening of the housing, applied to the circuit board, integrated adjacent to the transparent side wall or in the closure cap.

In one embodiment, the antenna structure can be adapted to conform to a shape of the side or the closure cap. For example, the housing which can be formed, in particular, of the dielectric material, can have a structural shape having curvature, such that in this case, a conforming antenna structure is used. The antenna structure can thus be designed such that it follows the housing contour and achieves a predetermined emission behaviour.

The antenna structure can have different emission characteristics which can be perceived as different channels when determining the distance. For example, the antenna structure can emit the transmission wave with two orthogonal polarisations simultaneously or one after the other, whereby two different reflection waves are received from the object and a polarimetric evaluation is possible. Further information about the object can be obtained via the additional channel, such as, for example, conclusions about the orientation of the object (provided that the material of the object or the object itself has a reflection factor which is dependent on the polarisation). For example, this is the case in many carbon fibre-reinforced plastics, depending on the arrangement of the fibres.

In one embodiment, the sensor electronics can be set up to measure a complex voltage which is indicative of the received reflection wave, and to determine a measured reflection factor based on the measured voltage. This measure can form the basis of the idea that the reflection factor can be determined especially simply by means of a more easily determinable value, namely the voltage. Here, the voltage of the reflection wave can be measured as the only parameter in a distance measurement, because this voltage can correspond to a reflection factor of the reflection wave up to a scaling value, namely the voltage of the transmission wave. In this way, it is possible that only the voltage of the reflection wave but not, however, the voltage of the transmission wave must be measured for the distance measurement. Here, the scaling factor can be determined by means of a calibration of the sensor which is carried out before the distance measurement, by a distance measurement being carried out with an object which is arranged directly on the side of the sensor (distance zero), and the scaling being chosen such that the resulting voltage of the reflection wave can be equal to −1. The complex-valued scaling factor can be stored (for example as a table) in the sensor electronics, depending on the frequency of the transmission wave. Here, the stored scaling factor for each stored frequency can be characterised by its magnitude and its phase.

In one embodiment, the measured reflection factor can additionally be determined based on a reflection factor which can be indicative of a transition (in particular of the transmission wave(s)) from the antenna structure into a free space. The free space can refer to a space outside the sensor (e.g. the sensor housing). Here, the reflection factor describing the transition from the antenna structure into the free space can be determined, for example, by means of a blank measurement before an actual use of the sensor for detecting the distance. In such a blank measurement, a distance measurement is carried out in which there is no object in the detection range of the sensor. Because no reflection wave can be detected on the object in such an alignment, the measured reflection factor can correspond, due to the reflection factor of the transition of the wave from the active face of the sensor (in other words from the antenna structure), to the free space. The reflection factor describing the transition from the antenna structure into the free space can be subtracted from the measured voltage of the reflection wave, said voltage being standardised by means of the scale factor, in order to determine the measured reflection factor. This type of adjustment of the measured reflection factor can be carried out in each distance measurement.

In one embodiment, the sensor electronics can be set up to map the measured reflection factor to a further reflection factor by means of a self-learning mapping, said further reflection factor being able to correspond to an ideal reflection factor (i.e. the one adjusted by the reflection factor that describes the transition from the antenna structure into the free space). The sensor electronics are furthermore set up to determine the distance using the further reflection factor. Determining the distance can thus be further simplified by machine-learning technology, for example neural networks, being able to be used instead of a complex signal model which only insufficiently describes reality. The self-learning mapping can be used to compensate for the influence of (multiple) reflections and of diffraction influences on the environment and the on installation situation, and to carry out a rough measurement of the distance. The self-learning mapping can make it unnecessary, for example, to know the exact installation situation of the sensor, the structural shape of the sensor and a surface shape of the object for an exact measurement of the distance. In this case, the self-learning mapping can take into account all of these effects through suitable teaching. The sensor can thus be operated in an environment in which multiple reflections can occur. Because only the measured reflection factor (and thus the measured voltage of the reflection wave) is used as the input value for the self-learning mapping, the self-learning mapping can use a single easily measurable input value. Radar sensors which are based on interferometry may not use any self-learning mapping, i.e. no teaching of the object to be detected, in their evaluation. Furthermore, in radar sensors it may not be necessary to compensate for multiple reflections because the transmission antenna and the reception antenna are far away from the object to be detected in such sensors.

The self-learning mapping is trained by means of training data and is then used by the sensor electronics. In active sensor operation, the self-learning mapping remains unchanged and does not carry out any further changes to itself.

In one embodiment, the self-learning mapping can additionally map the measured reflection factor to a signal, in particular to a signal value which is proportional to the distance. Here, the signal can represent, in particular, a voltage. The sensor electronics can furthermore be set up to select a phase interval from the mapped signal (in particular from the distance which is assigned to the signal value obtained by means of the mapping) for determining the distance. Because the signal is proportional to the distance, a rough determination of the distance can thus be carried out.

The requirements for the accuracy of the signal can therefore be set to be low during the teaching.

In one embodiment, the sensor electronics can be set up to determine the distance from a phase of the further reflection factor, using the selected phase interval. An exact accurate measurement of the distance can thus be enabled in an especially simple and exact manner, because a previously determined value, namely the phase interval, is used, and the distance can be clearly determinable with this value. During the accurate determination of the distance, a phase speed of the reflection factor can also be taken into account, said phase speed being able to be known, for example, as a polynomial from a previous calibration.

The transmission wave can thus be emitted at one or more frequencies and the voltage of the reflection wave can be measured for the one or more frequencies. The emission or measurement can only take place at one frequency when the sensor is intended to enable very high measurement rates. If the accuracy of the distance determination is to be increased, the emission or measurement can be carried out at several frequencies. Determining the further reflection factor and thus the phase of the further reflection factor can then take place at the one or more frequencies of the transmission wave in order to increase the accuracy of the distance measurement in both cases in comparison to the rough measurement of the distance.

In one embodiment, the object can be non-conductive or poorly conductive (i.e. non-metallic), or, in other words, can have a reflection factor not equal to −1. The sensor electronics can be set up to adjust the reflection factor by a further reflection factor of the object and to determine the distance from the adjusted reflection factor. In other words, objects having complex surface impedance can be taught. The range of use of the sensor can thus be improved because not only the distance of conductive objects but also of non-conductive or poorly conductive objects can be detected especially well. The adjustment of the further reflection factor by the reflection factor of the object can thus reduce a distance error which would occur without this adjustment. In order to determine the reflection factor of the objects, the object to be detected can be placed directly on the housing opening before the actual distance determination, a distance measurement can be initiated and the measured reflection factor can be determined. The reflection factor of the object can be stored in the sensor electronics.

The reflection factor describing the transition from the antenna structure into the free space, the measured reflection factor, the further reflection factor and/or the reflection factor of the object can be frequency-dependent and distance-dependent. The signal which is proportional to the distance can only be distance dependent.

In one embodiment, the multi-field zone proximity sensor can be calibrated for various types of multi-field zone proximity sensor in such a manner that the measured reflection factor can be the same, independent of the sensor type (for all multi-field zone proximity sensors). Such a calibration can be carried out, for example, before the distance determination, by the sensor facing into a tube in which a metallic stamp moves to and fro between known positions. With a distance measurement which has taken place, the result can be compared with the known distance in order to determine a systematic error of the sensor type from this. For each of the sensor types, a scatter matrix, a wave chain matrix, an ABCD matrix or an impedance matrix, for example, can be determined from the error, by means of which the measured reflection factor can be adjusted, before this factor can be used as the input value for the self-learning mapping. If such a calibration is carried out, it is furthermore possible that solely the same self-learning mapping can be used for all sensor types.

According to a second aspect, a method for measuring a distance of an object from a multi-field zone proximity sensor is provided, wherein the multi-field zone proximity sensor has a housing in which an antenna structure is incorporated which is arranged in or near a side of the housing, wherein the antenna structure emits an electromagnetic transmission free space wave and receives an electromagnetic reflection wave which is reflected on the object, wherein the distance of the object from the multi-field proximity zone is determined based on the received reflection wave.

The technical modes of action and advantages described with regard to the multi-field zone proximity sensor according to the first aspect apply in the same way for the method according to the second aspect.

In one embodiment, a complex voltage which is indicative of the received reflection wave can be measured and a measured reflection factor can be determined from the measured complex voltage.

In one embodiment, the measured reflection factor can additionally be determined based on a reflection factor which is indicative of a transition from the antenna structure into a free space.

In one embodiment, the measured reflection factor can be mapped to a further reflection factor by means of a self-learning mapping and the distance can be determined from the further reflection factor.

In one embodiment, the self-learning mapping can additionally map the measured reflection factor to a signal which is proportional to the distance and a phase interval for determining the distance can be selected from the mapped signal.

In one embodiment, the distance can be determined from the phase of the further reflection factor, using the selected phase interval.

In one embodiment, the object can be non-conductive or poorly conductive, and the further reflection factor can be adjusted by a reflection factor of the object and the distance can be determined from the adjusted reflection factor.

In one embodiment, the multi-field zone proximity sensor can be calibrated for various types of multi-field zone proximity sensors in such a manner that the measured reflection factor can be the same, independent of the multi-field zone proximity sensor type.

According to a third aspect, a program for a data processing unit, in particular for the sensor electronics, is provided, said program being set up to carry out steps of a method according to the second aspect when it is carried out by the data processing unit. The program can have instructions and form a control code which comprises an algorithm for carrying out the method.

A machine-readable storage medium can furthermore be provided on which a program according to the third aspect is stored. The machine-readable storage medium can be formed, for example, as external storage, as internal storage, as a hard drive or as a USB storage device.

BRIEF DESCRIPTION OF THE DRAWINGS

Exemplary embodiments of the invention are depicted in the drawings and are described in more detail in the description below. Here.

EMBODIMENTS OF THE INVENTION

Identical or similar components or elements are provided with the same reference numerals.

Figure 1:
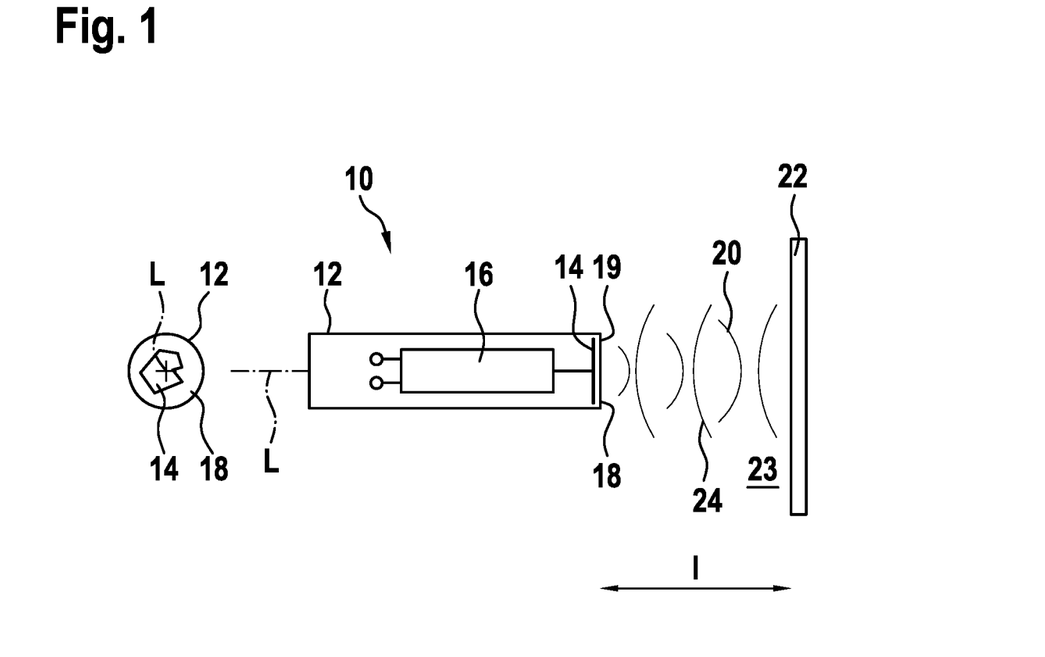
FIG. 1 schematically shows a multi-field zone proximity sensor according to an exemplary embodiment in a side view and a plan view from the front.

A multi-field zone proximity sensor 10 shown in FIG. 1 has a cylindrical sensor housing 12 in which a planar antenna structure 14 and sensor electronics 16 are incorporated. The antenna structure 14 is located adjacent to an opening 18 which is provided in a side 19 of the cylindrical sensor housing 12 and is consequently arranged in an aperture of the housing 12. The antenna structure 14 is set up to emit a high-frequency electromagnetic transmission wave 20 as a free space wave, without previous guidance in a waveguide, into a free space 23 in the direction of an object 22 and to receive a high-frequency electromagnetic reflection wave 24, which is at least partially reflected on the object 22, from the free space 23.

The sensor electronics 16 serve for controlling the antenna structure 14 so that this antenna structure 14 emits the transmission wave 20 and receives the reflection wave 24, and for determining a distance l of the object 22 from the sensor 10. A signal of the sensor electronics 16, said signal being assigned to the reflection wave 24, can thus be supplied, said sensor electronics 16 being set up to determine a reflection factor $\Gamma_{Td}$ based on the signal and from this to determine the distance l between the multi-field zone proximity sensor 10 and the object 22.

Instead of the opening 18 in the side 19, the housing 12 can be produced from a material that is transparent for electromagnetic waves, for example Teflon, and can have no opening 18. It is also possible that only the side 19, here the side wall of the housing 12, is produced from such a material. In both cases, the antenna structure 14 can be applied directly to the inner side of the side 19 formed as the side wall.

Figure 2:
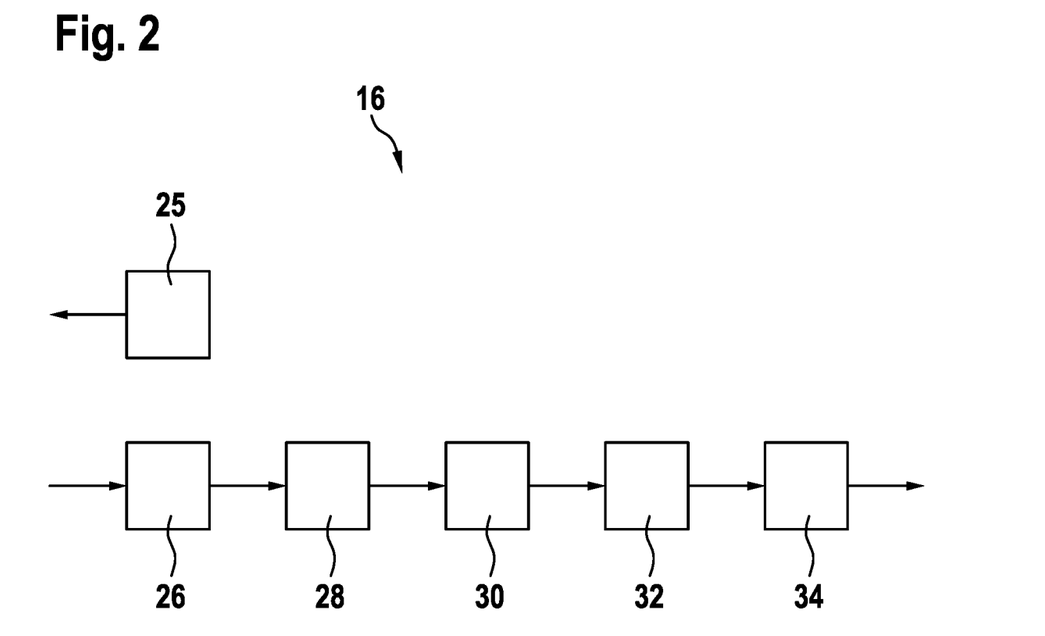
FIG. 2 schematically shows sensor electronics of the multi-field zone proximity sensor in FIG. 1.

The sensor electronics 16 depicted in FIG. 2 have a generator 25 for generating the high-frequency electromagnetic transmission wave 20 which is to be emitted. Furthermore, the sensor electronics 14 have an amplifier 26 in a reception path for amplifying the signal assigned to the reflection wave 24, a frequency mixer 28 for generating a lower frequency based on an output signal of the amplifier 26, a preconditioner 30 for preconditioning the output signal of the frequency mixer 28, a microcontroller 32 for processing an output signal of the preconditioner 30 and an output stage 34 for outputting a corresponding output signal. The microcontroller 32 has an analogue-digital converter, by means of which the one complex-valued voltage can be measured. The output stage 34 is formed as a standardised unidirectional or bidirectional interface, for example corresponding to the IO-link standard.

Figure 3:
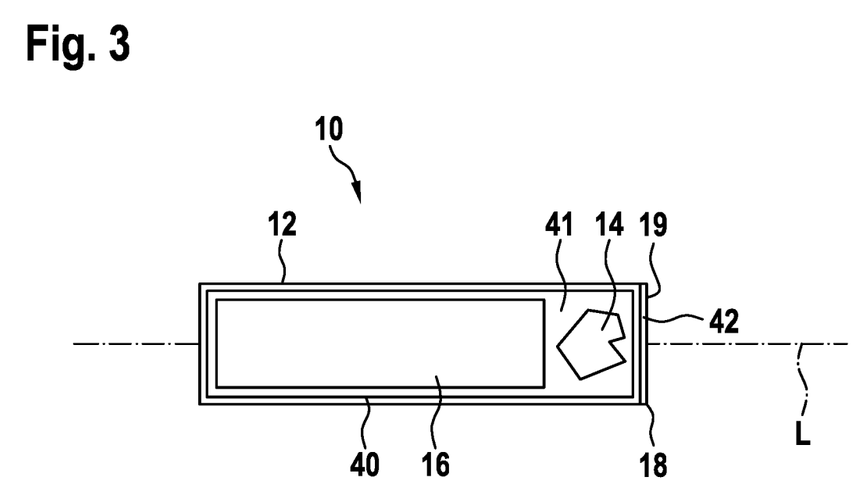
FIG. 3 schematically shows a further embodiment of the multi-field zone proximity sensor in FIG. 1 in a side view.

In the exemplary embodiment of the multi-field zone proximity sensor 10 shown in FIG. 3, a circuit board 40 is arranged in the cylindrical housing 12, to which the sensor electronics 16 are applied. Here, the circuit board 40 extends centrally in the sensor housing 12 along the longitudinal axis L of the sensor housing 12. The antenna structure 16 is applied to an end region 41 of the circuit board 40 near the opening 18 and spaced apart from the sensor electronics 16. A closure cap 42 which is made of plastic and is transparent for the transmission wave 20 and the reflection wave 24 closes the sensor housing 12 in the outward direction.

It is also possible that the side 19 is formed without opening 18, and the side 19 or the entire housing 12 is formed of such a material (e.g. Teflon) that is transparent for the electromagnetic wave. In both cases, the antenna structure 14 can be applied directly to the inner side of the side 19 formed as the side wall.

Figure 4:
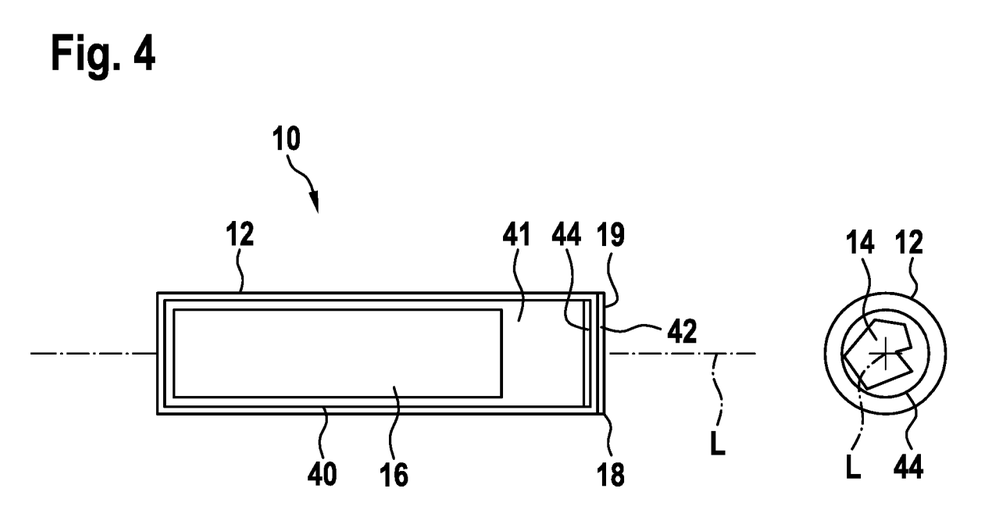
FIGS. 4 and 5 schematically show further embodiments of the multi-field zone proximity sensor in FIG. 1 in a side view and a plan view from the front.

The exemplary embodiment shown in FIG. 4 is formed similarly to the exemplary embodiment of the multi-field zone proximity sensor 10 in FIG. 3. However, a second circuit board 44 is arranged in the cylindrical housing 12, said second circuit board 44 extending in the region of the opening 18 along the opening 18 in the side 19 and covering the opening 18. The antenna structure 14 is not applied to the circuit board 40 but rather to the circuit board 44 in the outward direction. The opening of the housing 12 is closed with a closure cap 42 made of a material which is transparent for electromagnetic waves, for example Teflon. It is also possible that the side 19 is formed without opening 18 and the side 19 or the entire housing 12 is formed of such a material (e.g. Teflon) which is transparent for electromagnetic waves. In both cases, the antenna structure 14 can be applied directly onto the inner side of the side 19 formed as the side wall, such that the circuit board 44 is not provided.

Figure 5:
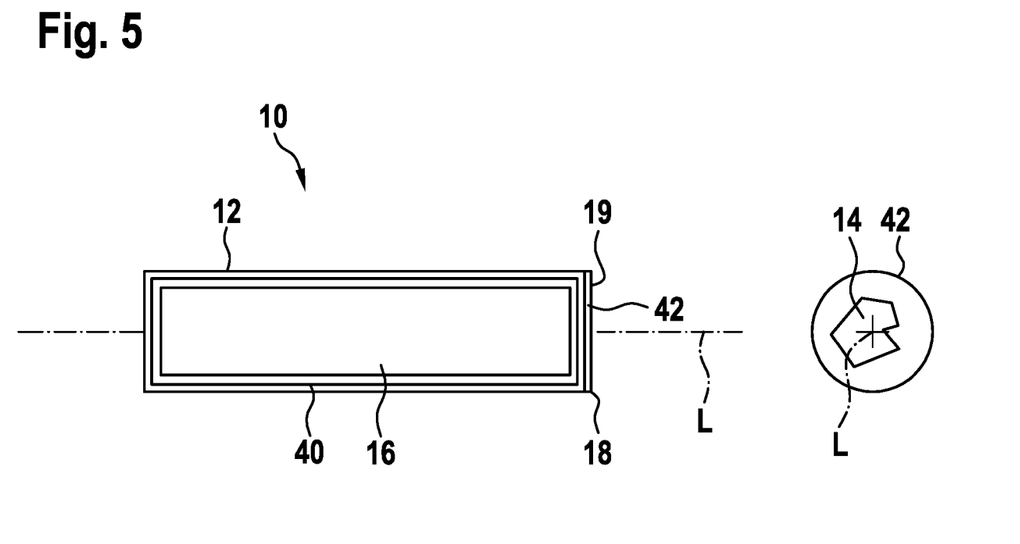

In the exemplary embodiment of the multi-field zone proximity sensor 10 shown in FIG. 5, a circuit board 40 extends along the entire longitudinal axis L of a cylindrical sensor housing 12. The sensor electronics 16 are applied along the entire length of the circuit board 40. A closure cap 42 made of, for example, Teflon, seals the sensor housing 12 in the direction of the object 22. The antenna structure 14 is moulded as a conductive plastic layer in the closure cap 42.

Figure 6:
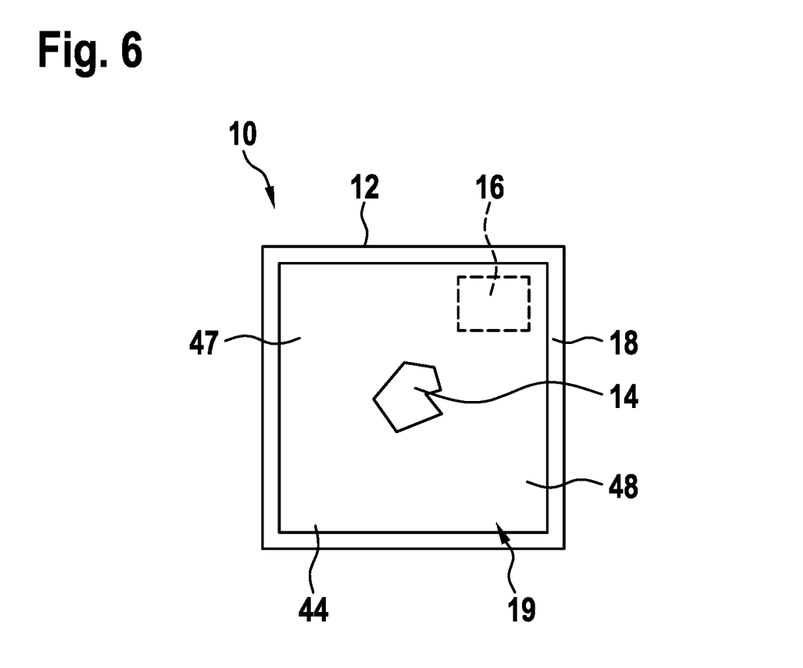
FIG. 6 schematically shows a multi-field zone proximity sensor according to a further exemplary embodiment in a plan view from the front.

The multi-field zone proximity sensor 10 shown in FIG. 6 has a cuboid-shaped sensor housing 12, into whose preferably largest side 19 the opening 18 is incorporated. The side 19 serves as an emitting face for a planar antenna structure 14. For this purpose, a circuit board 44 is provided in the housing 12, adjacent to the opening 18, to which the antenna structure 14 is applied centrally. The sensor electronics 16 are likewise provided on the circuit board 44. In order to prevent multiple reflection effects, the circuit board 44 is provided with an absorbent material 48 in all regions 47 on which the antenna structure 14 is not provided. The material can be applied, for example, as a layer. Optionally, the opening 18 can be sealed with a transparent closure cap 42 made of plastic, said closure cap 42 being transparent for the transmission wave 20 and the reflection wave 24 and closing the opening 18 outwardly.

It is also possible that the circuit board 44 only has the antenna structure 14 and the absorbent material 48, and the sensor electronics 16 are provided on a further circuit board in the housing 12. It is also possible that the antenna structure 14 is incorporated into the closure cap 42 in the form of conductive plastic, such that a circuit board located in the housing 12 carries the sensor electronics 16.

The side 19 can also be formed without opening 18 and the sensor 10 can be formed without a closure cap 42, and in this case, the side 19 or the entire housing 12 can be formed from a material (e.g. Teflon) that is transparent for electromagnetic waves.

Figure 7:
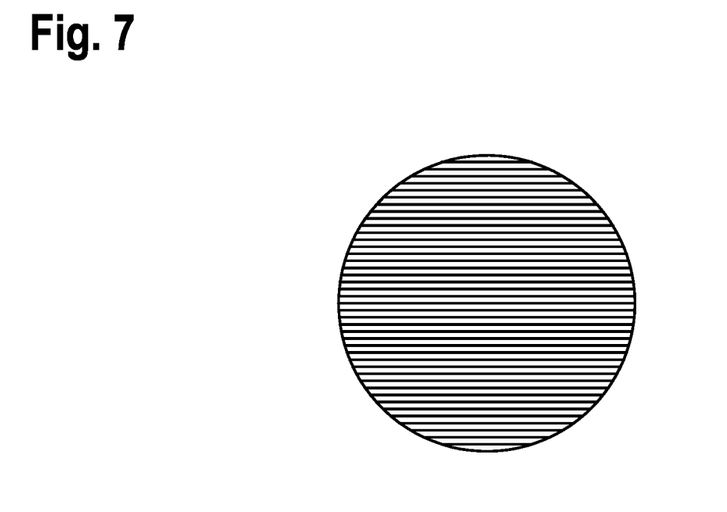
FIG. 7 schematically shows a surface of an object in a plan view, a reflection wave being reflected on said object in a polarisation-dependent manner in the direction of the multi-field zone proximity sensor in FIGS. 1, 3 to 6.

The antenna structure 14 can be set up to emit the transmission wave with two orthogonal polarisations, whereby two different reflection waves can be received from the object 22 and a polarimetric evaluation is possible in the sensor electronics 16. Further information on the object 22 can be obtained via the additional channel. FIG. 7 shows an object 22 which has a reflection factor dependent on the polarisation. In this case it is a carbon fibre-reinforced plastic. The reflection factor for the reflection wave 24 having horizontal polarisation is approx. −1 and the reflection factor for the reflection wave 24 having vertical polarisation would be approx. zero. The sensor electronics 14 process both reflection factors equally, as later described in detail with reference to FIG. 9, i.e. one per polarisation, whereby not only the distance of the object 22 but also, for example, the orientation of the object 22, or the orientation of the fibres in the exemplary embodiment of FIG. 7 can be determined.

During operation of the multi-field zone proximity sensor 10, the generator 25 of the sensor electronics 16 generates a high-frequency electromagnetic transmission wave 20 which is emitted by means of the antenna structure 14 in the direction of the object 20 as a free space wave. The electromagnetic reflection wave 24 reflected on the object 22 is received by the antenna structure 14 and guided to the sensor electronics 16. The reception path of the sensor electronics 16 determines a reflection factor $\Gamma_{Td}$ based on the received reflection wave 24, said reflection factor being characteristic of the reflection behaviour of the object 22, and from this determines a distance l between the multi-field zone proximity sensor 10 and the object 22. For this purpose, the received reflection wave 24 is amplified by means of the amplifier 26. An output signal of the amplifier 26 is transformed by means of the mixer 28 into a new lower frequency position, namely into the baseband. The baseband can also have the frequency zero. With a frequency and a distance l, the output signal of the mixer 28 is a complex-valued direct signal. The baseband is then preconditioned by means of the preconditioner 30 and the output signal of the preconditioner 30 is processed further by the microcontroller 32 which obtains the distance information from it. An output signal of the microcontroller 32 is characteristic of the distance to be determined. This distance signal can be formed, for example, as a switching signal when it falls below a predetermined distance, as an analogue signal (current or voltage) proportional to the distance or as a digital data signal. The output stage 34 outputs the output signal and optionally transforms the output signal into the standard implemented by the output stage 34.

In order to determine the distance of the object 22 from the sensor 10, it is assumed that the complex reflection factor $\Gamma_{Td}$ is frequency-dependent and length-dependent and can be depicted as $$\Gamma_{Td}(f, l) = -e^{-2\gamma l} = -e^{-2\left(\alpha(f,l) + j\frac{2\pi f}{c(l)}\right)l}.$$

Here, the index "T" stands for the object 22 ("target") and the index "d" stands for "distant" such that $\Gamma_{Td}$ describes the reflection factor for the location of the sensor. For l=0, $\Gamma_{Td}=-1$ applies. α(l) describes a damping constant and c(l) describes a phase speed of the reflection wave 24 for the distance l. The phase speed c(l) is not equal to the vacuum speed c for small distances l, because a wide mode spectrum exists in the near field of the antenna structure 14, whose overlap can be perceived as an effective wave in the signal model. The modes received in the spectrum, which are not capable of propagating, quickly subside with increasing distance l and an effective wavelength converges to the free space wavelength.

Figure 8:
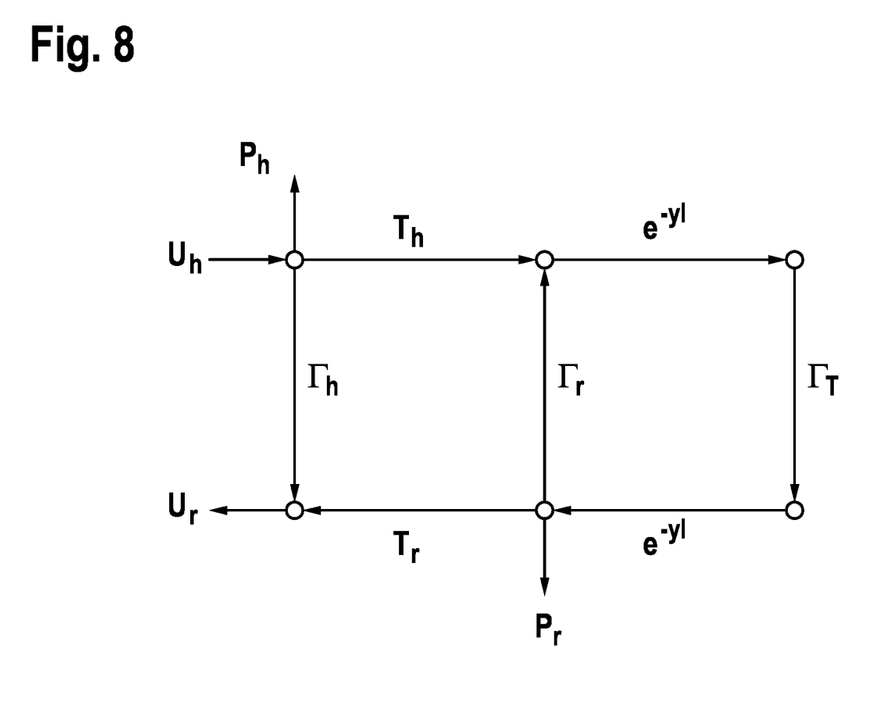
FIG. 8 schematically shows a signal flowchart which is based on a signal model.

In order to determine the reflection factor $\Gamma_{Td}$, a signal model can be assumed on which, for example, the signal flow diagram shown in FIG. 8 is based. The reflection factor is given as a function of the voltage $U_r$, which is indicative of the reflection wave 24, and of the voltage $U_h$, which is indicative of the transmission wave 20, according to $$\Gamma = \frac{U_r}{U_h} = \Gamma_h + \frac{T^2 \Gamma_T e^{-2\gamma l}}{1 - \Gamma_T \Gamma_r e^{-2\gamma l}}.$$

Here, the index h describes the "in-running" transmission wave 20, and the index r describes the "returning" reflection wave 24. In the signal model, the reciprocity of the transmission of the reflection wave 24 and the transmission of the transmission wave 20 is assumed, i.e. $T_h=T_r=T$ applies. Assuming that $\Gamma_T=-1$, the model can be simplified to $$\Gamma = \frac{U_r}{U_h} = \Gamma_h + \frac{-T^2 e^{-2\gamma l}}{1 + \Gamma_r e^{-2\gamma l}}.$$

As already described above, the index "T" describes the object 22. This results in the measured reflection factor Γ' being $$\Gamma' = \Gamma - \Gamma_h = \frac{-T^2 e^{-2\gamma l}}{1 + \Gamma_r e^{-2\gamma l}}.$$

Both the voltages $U_r$, $U_h$, as well as $\Gamma_h$ can be measured. The right part of the last equation is unknown and is assumed as a simplification in the signal model. In order to be able to better estimate this reflection factor Γ', a self-learning mapping is used for the object 22 instead of the signal model, wherein self-learning mapping maps the measured reflection factor Γ' to the reflection factor to be determined in the method, $\Gamma_{Td}$, which has the above-mentioned depiction. The use of the self-learning mapping is advantageous because the signal model depicts a simplification of reality and is only valid for certain installation situations. In particular, the signal model cannot take into account all physical effects for any installation situation. Furthermore, diffraction effects which occur either on the sensor 10, on a holder or on the object 22, are still taken into account in the signal model. The self-learning mapping on the other hand has such complexity that it is able to take into account signal paths which are not obtained in the signal model. The self-learning mapping can thus take into account the installation situation of the sensor 10, the structural shape of the sensor 10 and the surface shape of the object 22.

Figure 9:
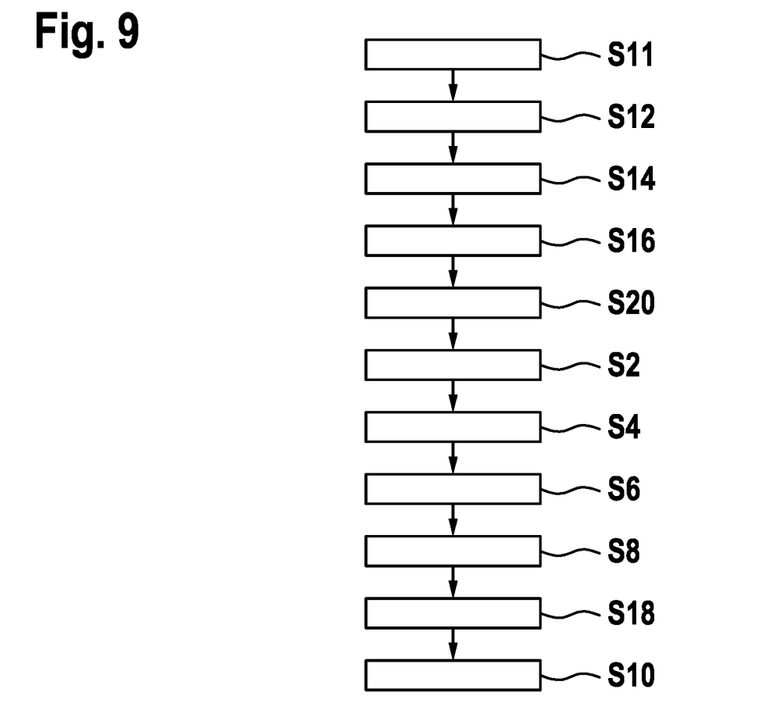
FIG. 9 schematically shows a flow diagram of a method for measuring a distance of the object using the multi-field zone proximity sensor in FIGS. 1, 3 to 6.

In a method for determining the object 22 from the sensor 10, the complex voltage $U_r$ is measured in a first method step S2 by means of the analogue-digital converter of the microcontroller 32. In a step S4, which is likewise carried out by the microcontroller 32, the measured reflection factor $$\Gamma' = \Gamma - \Gamma_h = \frac{U_r}{U_h} - \Gamma_h$$

is determined. For this purpose, the voltage $U_r$ is standardised by means of a known voltage $U_h$ of the transmission wave 20. The value of $U_h$ is stored depending on the frequency of the transmission wave 20, for example as a table, in the microcontroller 32, with an magnitude value of $U_h$ and a phase value of $U_h$ per frequency value. Furthermore, a measured reflection factor $\Gamma'$ is determined in step S4, taking into account the reflection factor $\Gamma_h$ which is assumed to be known. This measured reflection factor $\Gamma'$ is distance-dependent and frequency-dependent. The reflection factor $\Gamma_h$ has previously been determined by means of a blank measurement and likewise stored as a value in the microcontroller 32.

Figure 10:
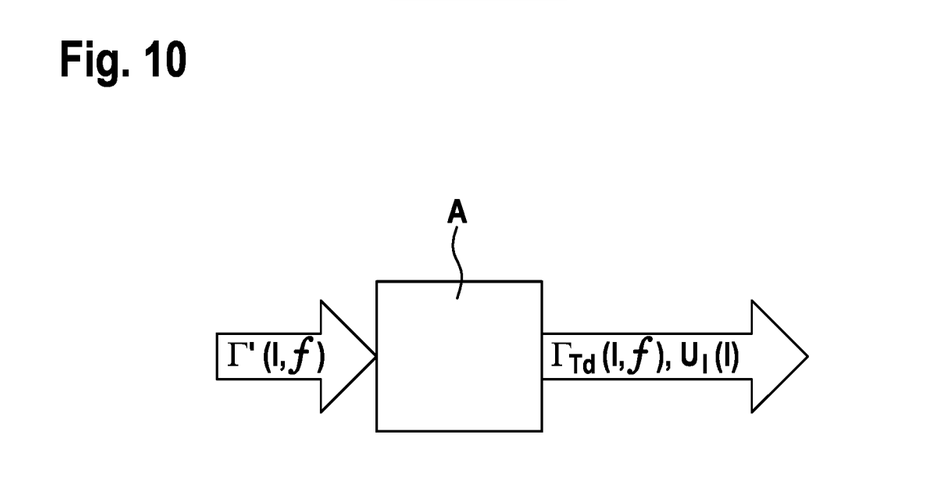
FIG. 10 schematically shows the principle of operation of a self-learning mapping which is used in the method in FIG. 9.
Figure 11:
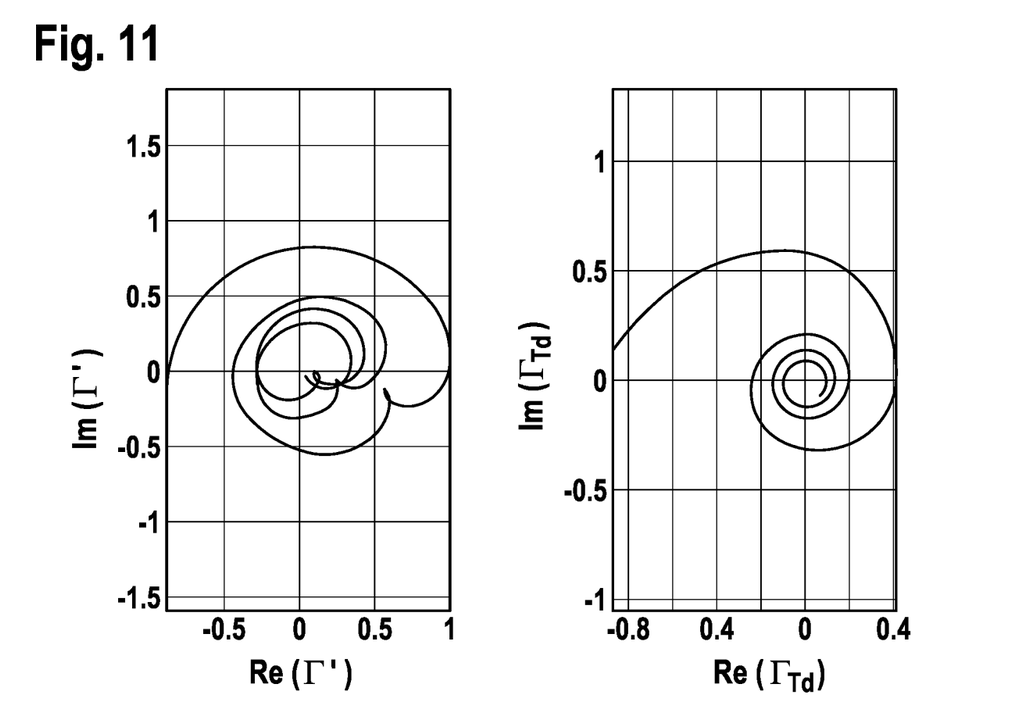
FIG. 11 schematically shows a measured reflection factor and a determined reflection factor which is determined by means of the self-learning mapping from FIG. 10.

In a further method step S6 carried out by the microcontroller 32, the measured reflection factor $\Gamma'$ is mapped to a reflection factor $\Gamma_{Td}$ by means of the self-learning mapping A, as schematically depicted in FIG. 10, as well as to a signal $U_l$ (l) which is proportional to distance l and represents a voltage. FIG. 11 shows an example of the measured reflection factor $\Gamma'$ in the left diagram and shows the reflection factor $\Gamma_{Td}$ obtained by means of the self-learning mapping in the right diagram. Here, in both diagrams, an x axis corresponds to the real part of the corresponding reflection factor and a y axis corresponds to the imaginary part of the corresponding reflection factor, at a frequency for 0≤l≤20 mm. It is clear that the reflection factor $\Gamma_{Td}$ is "smoothed" and scattering effects due to the installation situation are compensated for. The reflection factor $\Gamma_{Td}$ is complex-valued and is determined by a specific magnitude and a phase $\varphi(\Gamma_{Td})$. The phase $\varphi(\Gamma_{Td})$ of the reflection factor $\Gamma_{Td}$ is equal for various phase intervals n of the reflection factor, here $\varphi(\Gamma_{Td})=\varphi(\Gamma_{Td})+2\pi \ast n$ applies. The magnitude of the reflection factor $\Gamma_{Td}$ can be different for different phase intervals n. In other words, it is necessary to select the correct phase interval n in order to determine the distance l.

Figure 12:
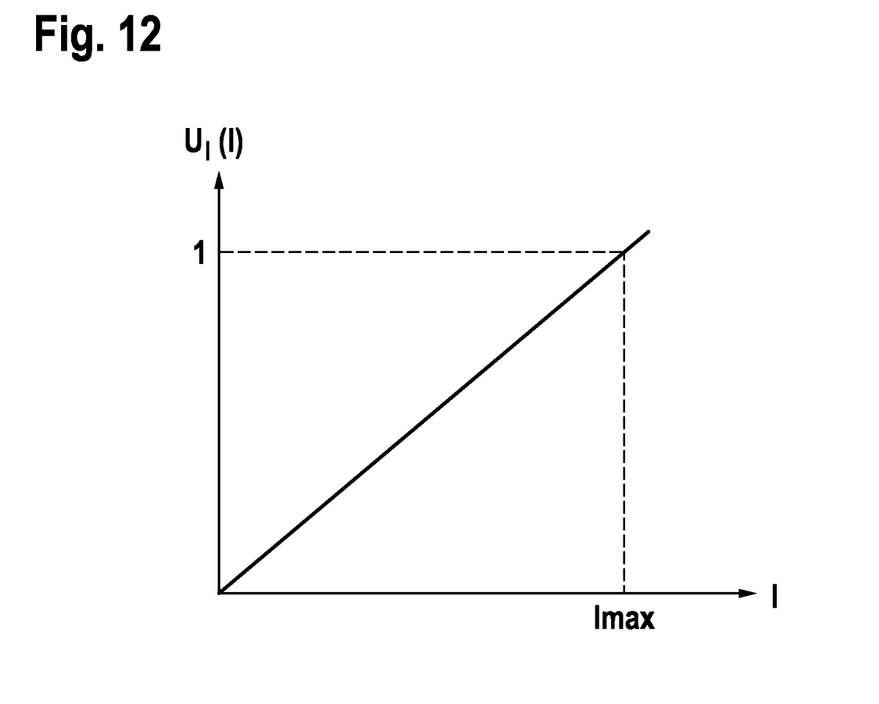
FIG. 12 schematically shows a signal $U_l(l)$ obtained with the self-learning mapping from FIG. 10, depending on the distance l.

In a further method step S8 carried out by the microcontroller 32, the phase interval n is determined from the signal $U_l$ (l) which has been provided in step S10. For a given object distance l, a number of the phase intervals n, from which the correct interval n must be selected by means of the coarse measurement, is dependent on the operating wavelength of the sensor 10. As is clear in the right-hand figure of FIG. 11, a robust determination of the interval in the coarse measurement of the distance between the first interval and the second interval can take place using the magnitude of the reflection factor (graphically, using the pointer length starting from point (0;0) up to a point on the "spiral circulation"), because here, the magnitude of the reflection factor has a high gradient and thus clearly differs in the two intervals and thus, the intervals n=1 or n=2 can be differentiated. Here, the first or second interval is formed by the magnitude value of the outermost "spiral" or the magnitude value of the next-to-outermost "spiral". The interval boundaries can be stored in the microcontroller 32 of the sensor 10. With an increasing distance l between the object 22 and the sensor 10, the "spirals" become smaller, such that the gradient of the magnitude becomes too small to enable an exact determination of the interval and thus an exact determination of the distance. It is therefore determined by means of the signal $U_l$(l) which phase interval n is present. FIG. 12 shows the magnitude of the signal $U_l$(l), depending on the distance l. Here, lmax describes the maximum value l of the sensor 10. A coarse distance measurement can optionally be carried out (for example, with larger distances l or with all distances) because the distance l can be deduced by means of the selected value $U_l$(l), here $U_l$(l)~1 applies. Using the distance l which has thus been roughly determined, the phase interval n is then determined, because each value of the distance l which has thus been determined is assigned to an interval value n. The number of phase intervals n decreases when the frequency is reduced. If the sensor 10 is operated with an operating frequency in the ISM bands (24.0 GHz-24.25 GHz, 5.725 GHz-5.875 GHz), ambiguous intervals of the phases can be reduced by a quarter with a reduction of the frequency from approx. 24 GHz to approx. 5.8 GHz.

In a further method step S10 carried out by the microcontroller 32, the exact distance measurement is carried out, in which the distance l is determined from the measured phase value $\varphi(\Gamma_{Td})$ of the reflection factor $\Gamma_{Td}$, taking into consideration the known distance-dependent phase speed c(l). The distance l is determined from these two values, using the phase interval n determined in step S8, by means of the relationship $$\frac{\varphi(\Gamma_{Td}) + n360°}{720°f} c(l) = l.$$

Because the phase speed c(l) is inconsistent, especially in the near field, the dependency of the phase speed c(l) can be determined from the distance l and thus the effective wavelength for a predetermined antenna structure 14 can be determined by means of a previous calibration, and the phase speed c(l) is stored in the sensor in the form of a polynomial or a mathematical curve.

In an optional method step S11 carried out by the microcontroller 32 which is carried out before the method step S2, the scale factor which corresponds to $U_h$ is determined by a corresponding calibration of the sensor 10 taking place. For this purpose, a distance measurement is carried out with an object 22 which is arranged directly on the side 19 of the sensor 10 and has the distance l=0. The scale factor is thus chosen such that the resulting voltage $U_r$ of the measured reflection wave 24 is equal to −1. The scale factor is stored (for example as a table) in the microcontroller 32, depending on the frequency of the transmission wave 20 with an magnitude value of the scale factor and a phase value of the scale factor per frequency value.

In an optional method step S12 carried out by the microcontroller 32, which is carried out before the method step S2 and after the method step S11, the reflection factor $\Gamma_h$, which is indicative of the transition from the antenna structure 14 into the free space 23, can be determined. For this purpose, the sensor 10 can be put into a programming mode, in which a blank measurement takes place without object 22 in the determining region of the sensor 10. A measurement of the voltages $U_r$ is initiated and the result $$\Gamma_h = \frac{U_r}{U_h}$$

with $U_h$ which is known from step S11 is stored in the microcontroller 32 of the sensor electronics 16, so that $\Gamma_h$ can be used in step S4. According to the signal model, this measured value corresponds to the desired reflection factor $\Gamma_h$. For example, this measurement can be carried out in the factory directly after the manufacturing, in a device provided for this purpose. Alternatively, the measurement can be additionally carried out, depending on need, by the customer themselves in a final measuring arrangement in which the sensor 10 is installed for its operation. Thus, for example, influences of the mounting of the sensor on $\Gamma_h$ can also be taken into account.

In an optional method step S14 carried out by the microcontroller 32, which is carried out after method step S12, the sensor 10 can be calibrated in order to compensate for scattering by sensors of different types. This causes all reflection factors $\Gamma'$ (l,f) to be identical for an identical measurement scenario with different sensors 10. Such a calibration is carried out, for example, by different sensors 10 measuring various distances l, which are likewise known, to a target 22. A scattering matrix can be determined from the errors between the measurement and the known distance, with which the measured reflection factor $\Gamma(l,f)$ can be corrected.

In a further optional method step S16, which is carried out, for example, between method steps S12 and S2, the self-learning mapping is trained and determined one time in a separate sequence, using training data, by means of machine-learning techniques, for example using a neural network. Providing that the calibration has been carried out in step S14, the self-learning mapping can be determined once for all sensors 10 of this type using training data, and can be used for all sensor types in operation for distance measurement. Otherwise, it is necessary that a different self-learning mapping is used per sensor type.

A plurality of measurements of the reflection factor $\Gamma'$ (l,f) and the associated distances l are recorded and presented to the teaching method for teaching the self-learning mapping. Depending on the type of method used for machine learning (neural network, etc.), the teaching process depends on the method used. If, for example, a neural network is used, then the weight of the connections between the various neurones changes during teaching until the output has the desired behaviour.

The reflection factors $\Gamma(l,f)$ measured by the sensors 10 are transmitted to a separate computer together with the position of the object 22, i.e. the distance l. The computer runs the actual training process. The result of the teaching process is stored on the individual sensors 10, for example in the microcontroller 32, and thus is available for the signal processing. In the actual sensor operation, the self-learning mapping is unchanged and does not carry out any further changes to itself. This means that no more teaching takes place.

The signal $U_l$ (l) is specially determined in the teaching process of the self-learning mapping from a plurality of measured reflection factors $\Gamma'$, which are measured at various frequencies. Typically, between 10 and 100 frequency points are present in an observed frequency band. There are only low requirements for the accuracy of the signal $U_l(l)$, because it only serves for determining the correct phase interval n. For this purpose, the accuracy must be smaller than half an operating wavelength of the sensor 10. For example, for an operating frequency of 24 GHz, there is a required accuracy of approx. 6 mm.

For conductive objects 22 with $\Gamma_T \approx -1$, the method can lead to a sufficiently accurate result, because the dielectric displacement current in the object 22 is significantly smaller than the conductor current. A surface impedance $Z_T$ of such objects 22 can be estimated by $$Z_T = (1+j)\sqrt{\frac{\omega \mu}{2\sigma}}.$$

Here, $\sigma$ describes the conductivity, $\omega$ an angular frequency and $\mu$ the permeability. For the object 22, this results in a reflection factor of $$\Gamma_T = \frac{Z_T - Z_{F0}}{Z_T + Z_{F0}}$$

with the value $Z_{F0} = 120\pi\Omega$ for the free space. Due to the high conductivity $\sigma$, the factor $$\sqrt{\frac{\omega \mu}{2\sigma}}$$

is small and it results in a reflection factor $\Gamma_T \approx -1$ which, as described above, was assumed in the signal model. Objects 22 which are non-conductive or poorly conductive and have a reflection factor not equal to $-1$ can also be detected in the method. Here, the phase $\varphi$ would not equal $\pm 180°$. With an operating wavelength $\lambda_0$, this would result in a distance error of $$|\Delta| = \frac{|180°| - |\varphi|}{720°} \lambda_0.$$

With a carbon fibre-reinforced plastic of the object 22 and an operating wavelength of $\lambda_0 = 12.5$ mm, this error would be in a range of 0.5 mm.

In order to avoid such a distance error which would occur with a non-conductive or poorly conductive object 22, an impedance or the reflection factor $\Gamma_{Td\,ref}$ of the object 22 is additionally detected as a reference reflection factor in a teaching process and stored in step S16 in the method. In an optional method step S18 which is carried out directly before method step S10, the determined reflection factor $\Gamma_{Td}$ is adjusted by means of the reference reflection factor $\Gamma_{Td\,ref}$. For this purpose, in a method step S20 which is carried out before step S2 and after step S16, the sensor 10 is put into a programming mode in which the object 22 to be detected is placed in a position directly on the sensor 10 (distance l=0) and a measurement of the voltage $U_r$ is carried out. The reflection factor $$\Gamma = \frac{U_r}{U_h}$$

which is thus obtained corresponds to the reference reflection factor $\Gamma_{Td\;ref}$ which is then stored in a memory of the sensor electronics 16 of the sensor 10. The programming mode is then exited again. In the active sensor operation in step S18, the current reflection factor $\Gamma_{Td}$ is adjusted by means of the reference reflection factor $\Gamma_{Td\;ref}$ such that the legitimate reflection factor is determined from $\Gamma_{Td_{korr}} = \Gamma_{td}/\Gamma_{Td\;ref}$ If the distance measurement is then carried out in step S10 on the basis of the adjusted reflection factor, no systematic length error occurs for the object 22, due to the finite impedance of the object 22.

Step S12 can also be carried out after step S16 or S20. Provided that two polarisations of the reflection wave 24 are measured, the method steps described above can be carried out separately for these two polarisations.

We claim:

1. Multi-field zone proximity sensor (10) for measuring a distance (l) of an object (22) from the multi-field zone proximity sensor (10), wherein the multi-field zone proximity sensor (10) comprises a housing (12) that comprises an antenna structure (14) that is arranged in or near a side (19) of the housing (12), wherein the antenna structure (14) is set up for emitting an electromagnetic transmission free space wave (20) and for receiving an electromagnetic reflection wave (24) reflected on the object (22), wherein the multi-field zone proximity sensor (10) comprises sensor electronics (16) which are set up to determine the distance (l) of the object (22) from the multi-field zone proximity sensor (10) based on the received reflection wave (24), wherein the sensor electronics (16) are set up to measure a complex voltage ($U_r$), which is indicative of the received reflection wave (24), and to determine a measured reflection factor (Γ') based on the measured complex voltage ($U_r$), wherein the measured reflection factor (Γ') is additionally determined based on a reflection factor ($\Gamma_h$) which is indicative of a transition of the transmission free space wave (20) from the antenna structure (14) into a free space (23) and which is determined prior to a distance measurement by a blank measurement which is performed by a distance measurement with no object in a detection range of the sensor (10).

2. Multi-field zone proximity sensor (10) according to claim 1, wherein the side (19) comprises an opening (18) and wherein the antenna structure (14) is arranged in or near the opening (18).

3. Multi-field zone proximity sensor (10) according to claim 2, wherein the opening (18) is closed with a closure cap (42) made of plastic.

4. Multi-field zone proximity sensor (10) according to claim 2, wherein the opening (18) is closed by means of a closure cap (42) made of plastic, in which the antenna structure (14) is incorporated or onto which the antenna structure (14) is applied, wherein the antenna structure (14) extends substantially perpendicular to a longitudinal axis (L) of the cylindrically formed housing (22).

5. Multi-field zone proximity sensor (10) according to claim 1, wherein at least the side (19) is formed of a material which is transparent for electromagnetic waves.

6. Multi-field zone proximity sensor (10) according to claim 1, wherein the housing (12) is formed cylindrically and the antenna structure (14) is applied to a board (40) which extends along a longitudinal axis (L) of the cylindrically formed housing (12) within the housing (12).

7. Multi-field zone proximity sensor (10) according to claim 1, wherein the housing (12) is formed cylindrically and the antenna structure (14) is applied to a board (44) which extends perpendicular to a longitudinal axis (L) of the cylindrically formed housing (22) in the region of the side (19) of the housing (22), with an opening (18).

8. Multi-field zone proximity sensor (10) according to claim 7, wherein a face (47) of the board (44) or of a closure cap (42), which is free from the antenna structure (14), is provided with an absorbent material (48).

9. Multi-zone proximity sensor (10) according to claim 1, wherein the housing (12) is formed to be cuboid-shaped and the side (19) corresponds to a largest side of the housing (22) or wherein the housing (12) is formed to be cube-shaped and the largest side (19) corresponds to one of the sides of the housing (12).

10. Multi-field zone proximity sensor (10) according to claim 9, wherein the antenna structure (14) is applied to a board (44) which extends along the side (19), with an opening (18), or wherein the opening (18) is closed with a closure cap (42) made of plastic, into which the antenna structure (14) is incorporated or onto which the antenna structure (14) is applied.

11. Multi-field zone proximity sensor (10) according to claim 1, wherein at least the side (19) of the housing is formed of dielectric material and the antenna structure (14) is arranged directly in the side (19) or on the side (19).

12. Multi-field zone proximity sensor (10) according to claim 1, wherein the antenna structure (14) is formed to be adapted to a shape of the side (19) or to a closure cap (42) in a planar manner or in a conforming manner.

13. Multi-field zone proximity sensor (10) according to claim 1, wherein the sensor electronics (16) are set up to map the measured reflection factor (Γ') to a further reflection factor ($\Gamma_{Td}$) by means of a self-learning mapping (A) and to determine the distance (l) from the further reflection factor ($\Gamma_{Td}$).

14. Multi-field zone proximity sensor (10) according to 13, wherein the self-learning mapping (A) additionally maps the measured reflection factor (Γ'), which is the only input parameter of the self-learning mapping (A), to a signal ($U_l(l)$) which is proportional to the distance (l) and wherein the sensor electronics (16) are set up to select a phase interval (n) from the mapped signal ($U_l(l)$) for determining the distance (l).

15. Multi-field zone proximity sensor (10) according to claim 14, wherein the sensor electronics (16) are set up to determine the distance (l) from a phase of the further reflection factor ($\Gamma_{Td}$) using the selected phase interval (n).

16. Multi-field zone proximity sensor (10) according to claim 13, wherein the object (22) is non-conductive or poorly conductive, wherein the sensor electronics (16) are set up to adjust the further reflection factor ($\Gamma_{Td}$) by a reflection factor ($\Gamma_{Td\;ref}$) of the object (22) and determine the distance (l) from an adjusted reflection factor ($\Gamma_{Td_{korr}}$).

17. Multi-field zone proximity sensor (10) according to claim 1, wherein the multi-field zone proximity sensor (10) is calibrated for various types of multi-field zone proximity sensors (10) in such a manner that the measured reflection factor ($\Gamma_{Td}$) is the same, independent of the multi-field zone proximity sensor type.

18. Multi-field zone proximity sensor (10) according to claim 1, wherein the measured reflection factor (Γ') is determined based on the measured complex voltage ($U_r$) by standardizing the complex voltage ($U_r$) with a complex-valued scaling factor ($U_h$) which is determined prior to the distance measurement by a calibration of the sensor (10)

which is performed before the distance measurement, by a distance measurement with an object arranged directly on the side (19) of the sensor (10).

19. Multi-field zone proximity sensor (10) according to claim 18, wherein the measured reflection factor (Γ') is determined based on the reflection factor ($\Gamma_h$) which is indicative of the transition of the transmission free space wave (20) from the antenna structure (14) into the free space (23) by subtracting the reflection factor ($\Gamma_h$) which is indicative of the transition of the transmission free space wave (20) from the antenna structure (14) into the free space (23) from the complex voltage ($U_r$) standardized by the complex valued scale factor ($U_h$).

20. Method for measuring a distance (l) of an object (22) from a multi-field zone proximity sensor (10), wherein the multi-field zone proximity sensor (10) comprises a housing (12) that comprises an antenna structure (14) that is arranged in or near a side (19) of the housing (12), wherein the antenna structure (14) emits an electromagnetic transmission free space wave (20) and receives an electromagnetic reflection wave (24) reflected on the object, wherein the distance (l) of the object (22) from the multi-field zone proximity sensor (10) is determined based on the received reflection wave (24), wherein a complex voltage ($U_r$) which is indicative of the received reflection wave (24) is measured and a measured reflection factor (Γ') is determined from the measured complex voltage ($U_r$), wherein the measured reflection factor (Γ') is additionally determined based on a reflection factor ($F_h$) which is indicative of a transition of the transmission free space wave (20) from the antenna structure (14) into a free space (23) and which is determined prior to a distance measurement by a blank measurement which is performed by a distance measurement with no object in a detection range of the sensor (10).

21. Method according to claim 20, wherein the measured reflection factor (Γ') is mapped to a further reflection factor ($\Gamma_{Td}$) by means of a self-learning mapping (A) and the distance (l) is determined from the further reflection factor ($\Gamma_{Td}$).

22. Method according to claim 21, wherein the self-learning mapping (A) additionally maps the measured reflection factor (Γ'), which is the only input parameter of the self-learning mapping (A), to a signal (MO) which is proportional to the distance (l) and wherein a phase interval (n) is selected from the mapped signal ($U_f(l)$) for determining the distance (l).

23. Method according to claim 22, wherein the distance (l) is determined from a phase of the further reflection factor ($\Gamma_{Td}$) using the selected phase interval (n).

24. Method according to claim 21, wherein the object (22) is non-conductive or poorly conductive, wherein the further reflection factor ($\Gamma_{Td}$) is adjusted by a reflection factor ($\Gamma_{Td\ ref}$) of the object (22) and the distance (l) is determined from an adjusted reflection factor $\Gamma_{Td_{korr}}$).

25. Method according to claim 20, wherein the multi-field zone proximity sensor (10) is calibrated for various types of multi-field zone proximity sensors (10) in such a manner that the measured reflection factor ($\Gamma_{Td}$) is the same, independent of the multi-field zone proximity sensor type.

26. Method according to claim 20, wherein the measured reflection factor (Γ') is determined based on the measured complex voltage ($U_r$) by standardizing the complex voltage ($U_r$) with a complex-valued scaling factor ($U_h$) which is determined prior to the distance measurement by a calibration of the sensor (10) which is performed before the distance measurement, by a distance measurement with an object arranged directly on the side (19) of the sensor (10).

27. Method according to claim 26, wherein the measured reflection factor (Γ') is determined based on the reflection factor ($\Gamma_h$) which is indicative of the transition of the transmission free space wave (20) from the antenna structure (14) into the free space (23) by subtracting the reflection factor ($\Gamma_h$) which is indicative of the transition of the transmission free space wave (20) from the antenna structure (14) into the free space (23) from the complex voltage ($U_r$) standardized by the complex valued scale factor ($U_h$).

28. A non-transitory machine-readable storage medium on which a program is stored, the program being for a data processing unit which is set up to carry out steps of a method for measuring a distance (l) of an object (22) from a multi-field zone proximity sensor (10), wherein the multi-field zone proximity sensor (10) has a housing (12) that comprises an antenna structure (14) that is arranged in or near a side (19) of the housing (12), wherein the antenna structure (14) emits an electromagnetic transmission free space wave (20) and receives an electromagnetic reflection wave (24) reflected on the object, wherein the distance (l) of the object (22) from the multi-field zone proximity sensor (10) is determined based on the received reflection wave (24), wherein a complex voltage ($U_r$) which is indicative of the received reflection wave (24) is measured and a measured reflection factor (Γ') is determined from the measured complex voltage ($U_r$), wherein the measured reflection factor (Γ') is additionally determined based on a reflection factor ($\Gamma_h$) which is indicative of a transition of the transmission free space wave (20) from the antenna structure (14) into a free space (23) and which is determined prior to a distance measurement by a blank measurement which is performed by a distance measurement with no object in a detection range of the sensor (10).

* * * * *